United States Patent
Hainzlmaier et al.

(10) Patent No.: US 11,373,227 B2
(45) Date of Patent: Jun. 28, 2022

(54) METHOD FOR PROVIDING A VEHICLE HAVING A CONTEXT-DEPENDENT CONFIGURATION

(71) Applicant: Audi AG, Ingolstadt (DE)

(72) Inventors: Andre Hainzlmaier, Geisenfeld (DE); Berthold Hellenthal, Schwanstetten (DE); André Blum, Gaimersheim (DE)

(73) Assignee: Audi AG, Ingolstadt (DE)

( * ) Notice: Subject to any disclaimer, the term of this patent is extended or adjusted under 35 U.S.C. 154(b) by 485 days.

(21) Appl. No.: 16/479,309

(22) PCT Filed: Jan. 8, 2018

(86) PCT No.: PCT/EP2018/050341
§ 371 (c)(1),
(2) Date: Aug. 15, 2019

(87) PCT Pub. No.: WO2018/137915
PCT Pub. Date: Aug. 2, 2018

(65) Prior Publication Data
US 2019/0378190 A1   Dec. 12, 2019

(30) Foreign Application Priority Data
Jan. 25, 2017   (DE) ..................... 10 2017 201 130.0

(51) Int. Cl.
*G06Q 30/00*   (2012.01)
*G06Q 30/06*   (2012.01)
(Continued)

(52) U.S. Cl.
CPC ......... *G06Q 30/0621* (2013.01); *B60W 40/08* (2013.01); *G05D 1/0088* (2013.01);
(Continued)

(58) Field of Classification Search
None
See application file for complete search history.

(56) References Cited

U.S. PATENT DOCUMENTS

2004/0181466 A1   9/2004 Ishida et al.
2012/0130769 A1   5/2012 Muddulapalli et al.
(Continued)

FOREIGN PATENT DOCUMENTS

DE   102010052437 A1   5/2012
DE   102011085660 A1   5/2012
(Continued)

OTHER PUBLICATIONS

International Search Report and Written Opinion of the International Searching Authority directed to related International Patent Application No. PCT/EP2018/050341, dated Feb. 16, 2018, with attached certified English-language translation; 18 pages.
(Continued)

*Primary Examiner* — Mila Airapetian
(74) *Attorney, Agent, or Firm* — Sterne, Kessler, Goldstein & Fox P.L.L.C.

(57) ABSTRACT

The present disclosure relates to a method for providing a vehicle having a context-dependent configuration, in which a vehicle is selected, configured and used for transporting the user on the basis of information relating to a context of a user, which was transmitted to a server, and wherein the context of the user is determined on the basis of control commands provided by the user with the aid of a program executed on a processing unit.

20 Claims, 1 Drawing Sheet

(51) Int. Cl.
  *B60W 40/08* (2012.01)
  *G05D 1/00* (2006.01)
  *G06Q 10/06* (2012.01)
  *G06Q 50/30* (2012.01)

(52) U.S. Cl.
  CPC ......... *G06Q 10/0631* (2013.01); *G06Q 50/30* (2013.01); *B60W 2540/043* (2020.02)

(56) References Cited

U.S. PATENT DOCUMENTS

| | | |
|---|---|---|
| 2014/0279021 A1 | 9/2014 | MacNeille et al. |
| 2015/0339928 A1 | 11/2015 | Ramanujam |
| 2015/0356665 A1 | 12/2015 | Colson et al. |
| 2016/0173568 A1 | 6/2016 | Penilla et al. |
| 2017/0285641 A1* | 10/2017 | Goldman-Shenhar ...................... B60W 50/14 |
| 2018/0004218 A1 | 1/2018 | Mielenz et al. |
| 2018/0154898 A1* | 6/2018 | Wrobel ................. B60W 10/04 |

FOREIGN PATENT DOCUMENTS

| | | |
|---|---|---|
| DE | 102014204227 A1 | 9/2014 |
| DE | 102015212493 A1 | 1/2016 |
| DE | 102015202468 A1 | 8/2016 |
| GB | 2438676 A | 12/2007 |
| WO | WO-2003/036600 A1 | 5/2003 |

OTHER PUBLICATIONS

International Preliminary Report on Patentability directed to related International Patent Application No. PCT/EP2018/050341, dated May 2, 2019, with attached English-language translation; 13 pages.

* cited by examiner

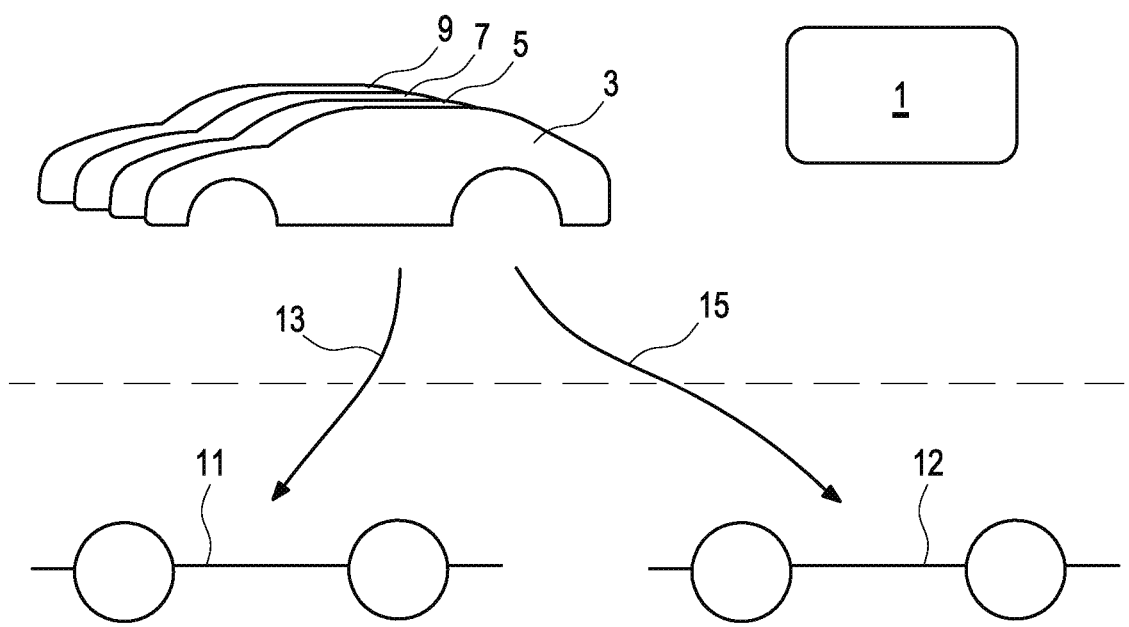

METHOD FOR PROVIDING A VEHICLE HAVING A CONTEXT-DEPENDENT CONFIGURATION

TECHNICAL FIELD

The present application relates to a method for providing a vehicle having a context-dependent configuration, and a transport system.

BACKGROUND

In order to transport a person with a vehicle, so-called "car-sharing models" can be used, with which the person can select and rent a vehicle on an internet platform. This requires elaborate selection and booking steps before the person can use a vehicle.

Furthermore, internet-based sales platforms are known, on which a user can gather information about and possibly purchase products of all kinds.

The US Patent Publication No. US 2015/0356665 A1 discloses a method, in which a user of a vehicle is provided with offers of a dealer on a display unit. The offers can be changed on the basis of a current position of the vehicle. Furthermore, it can be provided that a product purchased from the vehicle is manufactured or provided while the user is approaching the dealer with the vehicle.

From DE 10 2015 212 493 A1, a method for providing purchased goods in a trunk of a vehicle is known, wherein the trunk is opened by means of a code from a courier.

A method for automatically moving a vehicle from a parking lot to a loading location is disclosed in the German publication DE 10 2015 202 468 A1.

BRIEF DESCRIPTION OF THE DRAWINGS/FIGURES

FIG. 1 shows a schematic depiction of a configuration of a motor vehicle, in accordance with some embodiments.

DETAILED DESCRIPTION

The present application addresses the problem of providing a vehicle for transporting a customer to a representative of a company, in which the vehicle may display customer-specific information to the customer on a route to the company.

In accordance with some embodiments, a method for providing a vehicle having a context-dependent configuration is disclosed. The method includes selecting a vehicle, which is configured and used for transporting the user on the basis of specifications relating to a context of a user. The specifications relating the context of the user may be transmitted to a server. For this purpose, it is provided that the context of the user is determined on the basis of control commands provided by the user with the aid of a program executed on a processing unit.

Embodiments of the present application will become apparent from the description and the dependent claims.

The present application is particularly used for providing a vehicle that is configured according to a context of a user. For this purpose, in some embodiments, it is provided that the context of the user is determined on the basis of control commands provided by the user with the aid of a program executed on a processing unit. In other words, the context of the user is determined on the basis of control commands provided in the program or by means of the program, in that, for example, virtual objects viewed by the user by means of the program, or virtual objects selected, i.e., stored on a list, such as a digital shopping cart, are detected by means of a processing unit executing the program. It is particularly provided that configuration parameters, which indicate an exact configuration of a vehicle, are assigned to respective virtual objects. For example, it can be provided that the configuration parameters "leather odor," "dimmed light," and "luxurious decor" are assigned to a virtual object named "Prada handbag." Based on the configuration parameters, a vehicle provided for transporting the user can be configured in accordance with the virtual object.

In some embodiments, depending on the context of the user, a vehicle is used to transport a user. This means that, in case of an entry of a specific control command of the user by means of the program provided according to the application, a vehicle is configured to transport the user and correspondingly sent to the user using, e.g., an autonomous driving assistant, in order to transport the user, e.g., to a specified location indicated in the program or by means of the program. For that purpose, it is provided that the vehicle selected for transporting the user is configured on the basis of the current context of the user, i.e., by means of respective configuration parameters determined by the context of the user.

Within the scope of the present disclosure, a context of a user refers to a pattern of control commands provided by means of the program executed in the processing unit. For that purpose, respective control commands, which are provided by the user by means of the program executed in the processing unit can be matched with, e.g., patterns of control commands which are predetermined in a table and assigned to respective configuration parameters. Thus, a context of a user, who, e.g., views sports tires for a vehicle, e.g., by means of the program, such as a browser, can result from the control commands provided by the user when viewing or selecting the sports tires and be used for selecting configuration parameters which correspond to the context of the user for configuring a vehicle.

In some embodiments, it is provided that the control commands provided by the user for viewing or selecting the sports tires are assigned to a configuration parameter called "sporty motorization," and so a vehicle used for transporting the user is configured with a sporty or powerful motorization when a pattern of control commands which corresponds to the viewing or selecting of the sports tires is detected by the program or reported to the server provided according to the invention.

Within the context of the present disclosure, specifications relating to a context of a user refer to information that describes a context of the user, i.e., respective control commands provided by the user or information stored in a digital profile of the user. Such specifications can be derived from control commands provided by a user, e.g., by combining specific patterns of control commands to one specification. Respective specifications can also comprise respective control commands provided by a user and/or information read from a digital profile of the user.

In some embodiments, it is provided that the specifications about the context of the user are transmitted to the server via a secure connection.

In order to transmit respective control commands, which are provided by the user and detected by the program to the server it is particularly provided that the program communicates with the server via a predetermined interface, which, e.g., is realized via a secure connection. Any other technically suitable interface can be used for the program to communicate with the server.

In some embodiments, it is provided that the context of the user is determined on the basis of user data stored in a digital profile of the user.

In order to determine a context of a user and, correspondingly, configuration parameters for the configuration of a vehicle, it is possible to evaluate both control commands provided by the user, e.g., "clicks" carried out by means of a computer mouse, or operating gestures made on a touch-sensitive surface. It can further be provided that information collected in a digital profile of the user is taken into account when determining respective configuration parameters. For example, specifications about a shopping behavior or a current status of the user can be read from the digital profile. The information read from the digital profile can, e.g., be assigned to respective configuration parameters on the basis of an allocation table.

Within the context of the present patent disclosure, a digital profile refers to a number of files or lists, in which characteristics and preferred setting parameters of a user, e.g., for a vehicle, or the program provided according to the invention are stored. A digital profile can be changed by a user and/or by a program.

In some embodiments, for assigning respective context information of the user, i.e., respective control commands and/or profile information, to respective configuration parameters, a machine learner or a machine learning algorithm(s) is used which, e.g., assigns context information, which is compiled about a corresponding user by means of training data provided by test users, to respective configuration parameters. The use of a machine learner or machine learning algorithm(s) significantly reduces maintenance costs for new or additionally available configuration parameters because a provision of fixed assignment rules can be forgone.

In some embodiments, it is provided that the vehicle is configured by means of an allocation table which assigns respective virtual objects viewed and/or selected by the user and/or respective user data from the digital profile of the user to corresponding configuration parameters.

An allocation of information stored in a digital profile of a user and/or an allocation of control commands provided by the user or correspondingly derived specifications to respective configuration parameters can be predefined in an allocation table. Such an allocation table can be updated by an administrator, such as a dealer, and so newly available configuration parameters are, e.g., assigned to a behavior of a user.

In some embodiments, it is provided that the vehicle is configured by adapting at least one component of the following list of components or a combination thereof: Infotainment system, lighting system, scenting system, body, motorization, vehicle type, and vehicle design.

In some embodiments, a vehicle provided for transporting a user is configured on the basis of specifications about a context, particularly a current context of the user. For this purpose, respective components of the vehicle can be switched, e.g., via a configuration unit in communicative connection with the vehicle, to a state corresponding to the specifications regarding the context of the user. Respective components of the vehicle are selected on the basis of the specifications about the context of the user, and the vehicle is changed correspondingly by means of the selected components. This means that, e.g., an interior of the vehicle is selected on the basis of a virtual object viewed or selected by a user by means of the program provided according to the disclosure. In such case, any components of the vehicle can be changed and/or exchanged in order to configure the vehicle according to the context of the user, i.e., in accordance with respective specifications about the context of the user. It is particularly provided that the user is supplied with information corresponding to the context of the user from display units and/or audio systems and/or scenting devices of the vehicle.

In some embodiments, it is provided that the vehicle is configured on the basis of a direct command to be provided by the user by means of the program.

In some embodiments, the vehicle is configured by means of a direct command. In other words, if a direct command, i.e., a control command directly resulting in an action, e.g., a configuration process of the vehicle, is provided, the vehicle is configured according to respective specifications about a context of the user and used for transporting the user. Accordingly, the user can configure a vehicle by means of the direct command, which, e.g., can be referred to as "1 click to physical product," such that the user is transported to a location which, e.g., can be selected within a user interface of the program, i.e., in the program, provided according to the embodiments described herein. It is provided that the vehicle is configured on the basis of specifications about a context of the user and generates a color scheme, e.g., in an interior of the vehicle, which corresponds to a virtual object viewed in the program by the user, and via a display unit provides the user with information about the virtual object.

By means of the program provided according to the embodiments described herein, a user can provide a direct command, and so, if required, the user can start a configuration of a vehicle according to the proposed method as described herein and be transported by means of a suitably configured vehicle. A direct command allows for the user, e.g., to be transported to a location, where the user can experience and test a real product. The direct command relieves the user of complex planning for organizing the user's transport. For this purpose, it is particularly provided that an autonomously driving vehicle is configured to drive to a location of the user and to transport the user to a location which is assigned to a current context of the user when the user activates or provides a corresponding direct command which, e.g., is offered as a control icon on a website.

In some embodiments, it is provided that the direct command is provided by means of a single input in the program executed on the processing unit.

A direct command, which results in a configuration of a vehicle according to corresponding specifications about a particularly current context of a user, is characterized in particular by the fact that it can be activated with only a single input, e.g., a "click" with a computer mouse or a single operating gesture on a touch-sensitive surface.

The present disclosure further relates to a transport system for the context-dependent transport of a user, having a processing unit, in which a program is executed, a server that is communicatively connected to the processing unit, and a number of vehicles, wherein the server is configured to select and configure a vehicle from a number of vehicles using the specifications about a context of the user transmitted by the processing unit to the server, and to use said vehicle for transporting the user, and wherein the program is configured to determine the context of the user using control commands provided by the user by means of a program executed in a processing unit.

The proposed transport system is used particularly for carrying out the embodiments of the proposed method.

In some embodiments, the transport system may comprise a fleet of vehicles, which are administered and configured by a central administration unit in the form of a server. The administration unit directly controls a respective vehicle of the fleet and transmits to the respective vehicle, e.g., information about an interior program to be set, which controls components arranged in an interior space of a vehicle, such as display units, audio systems, and scent generators, in accordance with configuration parameters determined on the basis of specifications about a context of a user. Furthermore, the administration unit can be connected to a configuration system that is used to exchange components of a vehicle, such as its body or its drive. The administration unit and the configuration system are controlled on the basis of specifications about a context of a respective user to be transported.

In some embodiments, the transport system may include a vehicle that is an autonomously driving vehicle, and the server is configured to select a chassis and/or a body and/or a setting profile of respective interior components using an allocation table which assigns respective configuration parameters to the corresponding control commands of the user, and to configure the vehicle with the selected chassis and/or the selected body and/or the selected setting profile of respective interior components of the vehicle using an automatic configuration device.

By means of different setting profiles for respective interior components of a vehicle, a user, depending on said user's context, can be offered different experience spaces in that, e.g., audio and/or video systems of the vehicle are configured to provide sound and/or color backdrop appropriate for the context of the user. This means that, e.g., a sound and/or color backdrop, which is suitable or adapted to a control command specified by the user by means of the program provided according to the invention, is selected, e.g., from a list and adjusted on the vehicle.

Further advantages and embodiments will become apparent from the description and the attached drawings.

It is evident that the features mentioned above and those yet to be described below can be used not only in the particular combination indicated, but also in other combinations or in isolation, without exceeding the scope of the present disclosure.

The disclosure is depicted schematically by means of embodiments in the drawings and shall be described schematically and in detail with reference to the drawings.

FIG. 1 shows a schematic depiction of a configuration of a motor vehicle, in accordance with some embodiments. FIG. 1 shows a configuration system 1, by means of which a vehicle is configured according to a context of a user when the user activates a corresponding direct command. This means that a context of the user is detected in that control commands in the form of "clicks," which are provided by means of a program, such as a browser, are evaluated by the user. On the basis of the control commands provided by the user, configuration parameters are determined via an allocation table and used by the configuration system 1 to configure the vehicle. For this purpose, the configuration system 1 selects a body 3, 5, 7, 9 with a respective interior adapted to the context of the user, i.e., a so-called "hat" for the vehicle, and combines a body 3, 5, 7, 9 with a chassis 11 or 12 as indicated by arrows 13 and 15. The chassis 11, for example, can be a base mobility platform, i.e., a chassis with a predetermined basic structure. Furthermore, the chassis 12 can be an individual structure specifically adapted to the needs of the user and, e.g., selected or configured using the allocation table. Both the chassis 11 and the chassis 12 can be combined with bodies 3, 5, 7, or 9. Body 5, for example, has a sporty decor, body 3 has a luxurious decor, body 7 has a puristic decor, and body 9 has a decor to be configured individually.

For example, according to the allocation table, it is provided that, when the user views and selects, i.e. stores, e.g., in a shopping list, a virtual object, such as a product from a category of "sports accessories," a chassis 12 is equipped with a sporty body 5 when the user orders a vehicle. In order to order the vehicle, the user can activate a control icon that triggers a direct command.

Accordingly, a context of the user, i.e., respective control commands detected by the program and provided by the user, is evaluated after the user has activated the control icon for the direct command. Based on the evaluation of the context of the user, i.e., based on corresponding specifications about the context of the user derived from the context of the user, corresponding configuration parameters are selected. The vehicle is subsequently configured according to the configuration parameters. Once the vehicle is configured, the vehicle is sent to a current location of the user to collect and, e.g., transport the user to a representative of a dealer for sports accessories. On the way to the dealer, the user is provided with information about a product selected by said user. In order to introduce the user to the selected product, a color selection within the vehicle is adjusted to a color scheme of a brand of a product selected by the user. For this purpose, the configuration parameters of the color scheme of the vehicle were adjusted by means of an allocation table which assigns the control commands provided by the user for the selection of the product to corresponding configuration parameters. In this case, the allocation table can also include information about which configuration parameters are to be used with priority if a plurality of competing configuration parameters is determined.

The invention claimed is:

1. A method, comprising:
   receiving, at a server, at least one control command from a program executed on a processing unit;
   determining, at the server, a context based on the received at least one control command, wherein the determined context includes a pattern of the at least one control command;
   matching, via a table, respective configuration parameters based on the pattern of the at least one control command;
   selecting, at the server, a vehicle based on the determined context and the matched respective configuration parameters; and
   configuring, at the server, the selected vehicle based on the matched respective configuration parameters,
   wherein the selected vehicle is further configured based on information corresponding to the determined context for transportation in the selected vehicle having a context dependent configuration.

2. The method of claim 1, further comprising receiving, at the server, specifications about the determined context via a secure connection.

3. The method of claim 1, further comprising determining, at the server, the context based on stored virtual objects, and wherein the program executed on the processing unit is an interne browser.

4. The method of claim 1, further comprising determining, at the server, the context based on user data stored in a digital profile of a user.

5. The method of claim 1, wherein configuring the selected vehicle comprises:

assigning, at the server, at least one of virtual objects and user data into an allocation table; and configuring, at the server, the selected vehicle based on the allocation table, wherein the virtual objects are viewed or selected by a user, and wherein the user data is selected from a digital profile of the user and corresponds to the configuration parameters of the selected vehicle.

6. The method of claim 1, wherein configuring the selected vehicle comprises:

adapting, at the server, at least one component of the selected vehicle, wherein the at least one component of the selected vehicle comprises one or more of infotainment system, lighting system, scenting system, body, motorization, vehicle type, and vehicle design.

7. The method of claim 1, wherein configuring the selected vehicle comprises:

receiving, at the server from the program, a command specifying the configuration parameters; and configuring, at the server, the selected vehicle based on the configuration parameters.

8. The method of claim 7, wherein the command specifying the configuration parameters is provided as a single input in the program.

9. The method of claim 6, wherein the at least one component is selected from a list of vehicle components.

10. The method of claim 1, further comprising:

configuring, at the server, the selected vehicle to transport a user from a current location of the user to a representative of a company, wherein the program is a browser adapted to display an internet presence of the company.

11. The method of claim 1, wherein the selected vehicle is an autonomously driven vehicle.

12. The method of claim 6, wherein the at least one component of the selected vehicle is selected using an automatic configuration device.

13. A transport system, comprising:

a processing unit configured to execute a program; and a server, wherein the server is communicatively coupled to the processing unit and configured to:

receive at least one control command from the program executed on the processing unit;

determine a context based on the received at least one control command, wherein the determined context includes a pattern of the at least one control command;

match, via a table, respective configuration parameters based on the pattern of the at least one control command;

select a vehicle from a plurality of vehicles based on the determined context and the matched respective configuration parameters; and configure the selected vehicle based on the matched respective configuration parameters, wherein the selected vehicle is further configured based on information corresponding to the determined context for transportation in the selected vehicle having a context dependent configuration.

14. The transport system of claim 13, wherein the server is further configured to:

assign the configuration parameters associated with the at least one control command into an allocation table; and select at least one component of the selected vehicle based on the allocation table to configure the selected vehicle, wherein the at least one component of the selected vehicle comprises at least one of a chassis, a body, and an interior component.

15. The transport system of claim 13, wherein the selected vehicle is an autonomously driven vehicle.

16. The transport system of claim 13, wherein the at least one component of the selected vehicle is selected using an automatic configuration device.

17. The transport system of claim 13, wherein the server is further configured to receive specifications about the determined context via a secure connection.

18. The transport system of claim 13, wherein the server is further configured to determine the context based on stored virtual objects, and wherein the program executed on the processing unit is an internet browser.

19. The transport system of claim 13, wherein the server is further configured to determine the context based on user data stored in a digital profile of a user.

20. The transport system of claim 13, wherein the server is further configured to adapt at least one component of the selected vehicle, wherein the at least one component of the selected vehicle comprises one or more of infotainment system, lighting system, scenting system, body, motorization, vehicle type, and vehicle design.

* * * * *